Jan. 13, 1959
V. M. CARLTON
2,867,917
STAND FOR READING INSTRUCTION AND THE LIKE
Filed April 24, 1957
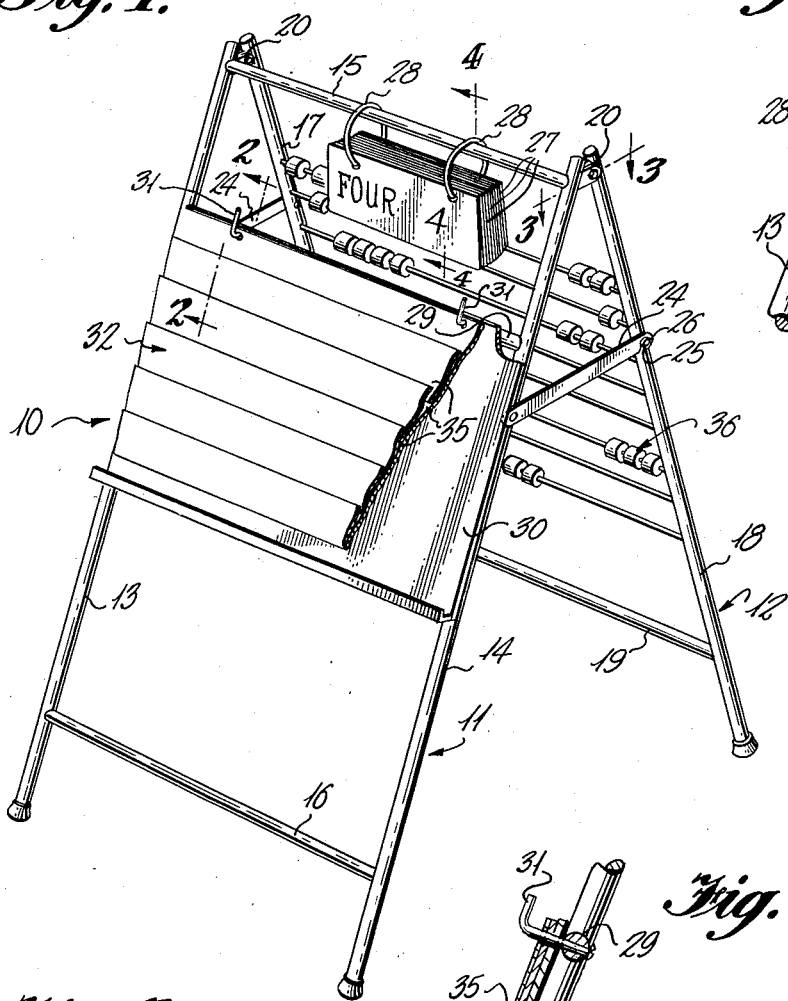
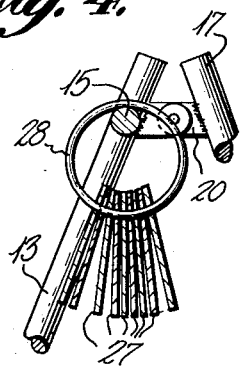
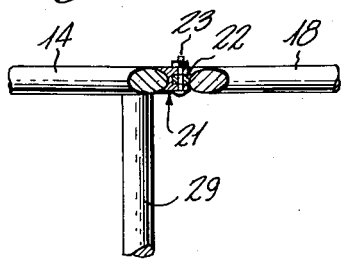
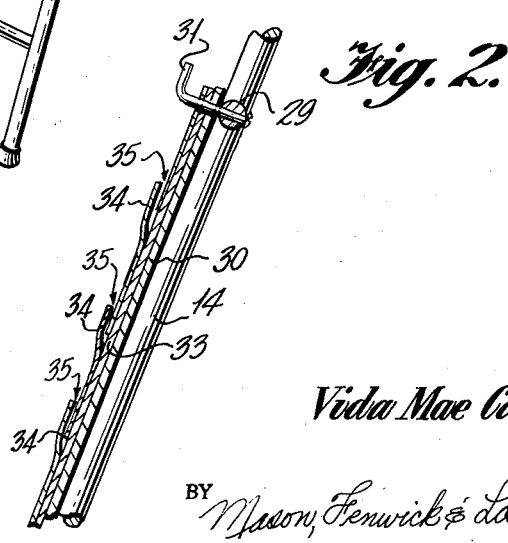
INVENTOR
Vida Mae Carlton
BY Mason, Fenwick & Lawrence
ATTORNEYS

United States Patent Office 2,867,917
Patented Jan. 13, 1959

2,867,917

STAND FOR READING INSTRUCTION AND THE LIKE

Vida Mae Carlton, San Angelo, Tex., assignor of one-half to Dorothy Howerton, San Angelo, Tex.

Application April 24, 1957, Serial No. 654,835

3 Claims. (Cl. 35—35)

The present invention relates in general to educational apparatus, and more particularly to apparatus especially adapted for classroom use in the primary school grades in connection with reading instruction.

It has become the practice in teaching reading classes in the primary grades in public schools to initially develop the students' familiarity with the words to be learned for a particular day's lesson by displaying in front of the class large cards on which are printed the words of the English language to be learned for that day's lesson. Through the years, the teachers have come to adopt a more or less general plan of keying the word to be taught for each day's lesson to the word listings in the guide books provided by the school for the teacher's use. It has become generally known through experience in reading education over a number of years, the words a child can learn first, and the general order of learning of words in the primary grades. The primary teacher usually follows the listing in some textbook or guide book as to the order of words, figures, numbers and phrases to be displayed in front of the children.

Under the present system used in most schools, the teacher maintains a large card file on the cards of which the words, figures and numbers to be displayed are printed. From this file which usually includes several hundred cards, the teacher withdraws the card appropriate to the particular day's lesson and displays it in front of the students. It is necessary to keep these cards in a file listed alphabetically in order to facilitate selection of individual cards containing the words in the text or guide book listing. At the completion of the lesson, the teacher then has to replace these cards in the file alphabetically. Since the teacher knows or has access to knowledge of the whole group of words which will be taught a particular class for the entire term, it is desirable to provide some means for keeping this group of cards together and have them available in proper order to be displayed to the class of students.

In most public schools, every primary teacher has several primary classes to teach each day. One class will be working on an easy word and a more advanced class will be working on a difficult word, all of which have to be passed to the student by sight. Also, as a primary class progresses, a number of the cards containing words which the students have learned to identify must be combined to facilitate sight identification of selected word groups and phrases. In the past, this combining of the cards has been done by the teacher holding up the several cards.

An object of the present invention is the provision of apparatus which will facilitate the selection and handling of such reading instruction cards so as to minimize the time required of the teacher in arranging and handling the cards for classroom instruction.

Another object of the present invention is the provision of novel apparatus for supporting and displaying such reading instruction cards in proper order for classroom instruction and in groups appropriate to the word progression of different primary classes.

Another object of the present invention is the provision of novel apparatus for supporting and displaying such reading instruction cards and including means for simultaneously displaying groups of such cards in selected arrangements.

Other objects, advantages and capabilities of the present invention will become apparent from the following detailed description, taken in conjunction with the accompanying drawing illustrating one preferred embodiment of the invention.

In the drawing:

Fig. 1 is a perspective view of apparatus for use in classroom reading instruction, embodying the present invention;

Figure 2 is a fragmentary vertical section view taken along the line 2—2 of Figure 1;

Figure 3 is a fragmentary horizontal section view taken along the line 3—3 of Figure 1; and Figure 4 is a fragmentary vertical section view taken along the line 4—4 of Figure 1.

Referring particularly to the drawing, wherein like reference characters designate corresponding parts throughout the several figures, the device of the present invention comprises a folding display rack or support 10 generally resembling an easel and formed of a pair of frames 11, 12 preferably constructed of tubular metallic material. The forwardly facing frame unit 11 comprises a pair of parallel generally vertically arranged legs 13, 14 interconnected adjacent their upper and lower ends by transverse rods 15, 16, respectively, which are welded or otherwise fixed to the legs 13, 14. The rearmost frame 12 likewise comprises a pair of parallel generally vertically extending legs 17, 18 which are interconnected adjacent their lower ends by a transverse rod 19. The legs 13, 17 and 14, 18, respectively, of the frames 11 and 12 are pivotally coupled together at their upper ends as indicated generally at 20 by a pivotal joint comprising a pair of ears 21 affixed to and projecting from one of the frame units, which employs a single ear 22 affixed to and projecting from the other frame unit, the ears 21 and 22 having registering apertures through which a bolt or the like 23 is projected to form a pivot pin. Spaced downwardly along the legs 13, 14 of the frame unit 11 from the pivotal coupling 20 are a pair of latch arms 24 which are pivoted at one end to the legs 13, 14 and are provided with latch openings 25 to hook over a latching stud 26 on each of the legs 17, 18 of the rear frame 12 to latch the frames in diverging relation as illustrated in Figure 1, to form the supporting rack.

The upper transverse rod 15 extending between the legs of the frame unit 11 serve as a support for a pack of cards indicated at 27 on which the words or figures to be used in reading instruction are printed. The cards 27 are preferably provided with a pair of apertures adjacent their upper edges which are in registry with each other and are adapted to receive large metallic rings 28 which extend about the transverse rod 15 and support the pack of cards 27 in depending relation therefrom. The rings 28 are preferably of the type having a pair of semicircular sections which are pivoted together at one end and are provided with locking shoulder formations at the other end of each section to be interengaged and lock the ring in the form of a closed circle.

The front frame unit 11 is also provided with an intermediate transverse rod 29 which is welded or otherwise affixed at its opposite ends to the legs 13, 14. A rectangular blackboard panel 30 is affixed to the front frame unit 11 with the vertical edges of the panel 30 substantially in alignment with the legs 13, 14 and the upper horizontal edge of the panel 30 in alignment with the uppermost portion of the intermediate rod 29. A pair of hook members 31 project forwardly from and are carried by the intermediate rod 29 and extend through the blackboard panel 30, to receive openings formed in a card holder unit 32 to removably support a card holder unit 32 in overlying relation to the blackboard panel 30. The card holder unit 32 preferably comprises a backing panel 33 formed of cardboard or the like to which a plurality of cardboard strips 34 of a length corresponding to the width of the backing panel 33 are adhered with the upper portions of the strips 34 free of the backing strip and lapping the lower edge portions of the adjacent strips to define pockets 35 for the reception of the cards from the cards 27.

In the use of the apparatus of the present invention, a large group of cards 27 having the words or figures imprinted thereon to be used by a particular class for several weeks or a full term are collected in proper order on the supporting rings 28 and the rings 28 are mounted on the transverse rod 15. In this way, the entire group of cards applicable to one particular class may be arranged on the rack 10 in such a way that the teacher can progress from one word to the next to be learned by the students by shifting the forwardmost cards 27 along the rings to a rearward position in the back. This eliminates the necessity of referring to guide books for each lesson to select the appropriate cards or filing the cards alphabetically in a cabinet each day. When the class progresses to the point where the students are ready to learn word groupings, several cards can be selected from the back and removed from the rings 28 and may be inserted in the pockets 35 in the card holder 32 in such a way that the words on the cards will be displayed in appropriate order on the card holder. When the card holder 32 is removed from the hooks 31, the blackboard panel 30 is exposed for use by the teacher in connection with reading instruction.

For convenience in arithmetic and number instruction, the rack 10 may also have an abacus, generally indicated by the reference character 36, formed between the legs 17, 18 lying within the horizontally projected outline of the backing panel 33.

While only one preferred embodiment of the invention has been particularly shown and described, it is apparent that other modifications may be made in the invention without departing from the spirit and scope thereof, and it is desired, therefore, that only such limitations shall be placed thereon as are imposed by the prior art and are set forth in the appended claims.

I claim:

1. Educational apparatus for use in teaching reading classes and the like wherein cards each imprinted with a word or figure to be taught during each lesson over the period of a selected teaching program are to be displayed to the class, comprising a display rack for continuously supporting the group of imprinted cards throughout the period of the teaching program including an easel having laterally spaced pairs of legs, a horizontal rod connected between said pairs of legs adjacent the upper ends thereof for supporting said cards in a pack, ring-like supporting members spaced from each other along the axis of said rod and extending through said cards and around said rod for releasably suspending the entire group of cards from said rod and forming uninterrupted guides along which the cards may be individually transferred from the front of the pack of cards over the rod to the back of the pack, and means extending transversely of the rack and supported by said legs forming horizontally arranged pockets for supporting a plurality of said cards in side-by-side relation below the level of said pack of cards when the cards are removed from suspended condition relative to said rod.

2. Educational apparatus for use in teaching reading classes and the like wherein cards each imprinted with a word or figure to be taught during each lesson over the period of a selected teaching program are to be displayed to the class, comprising a display rack for continuously supporting the group of imprinted cards throughout the period of the teaching program including a pair of downwardly diverging legs disposed at each side of the rack and lying in parallel planes, hinge means interconnecting the legs of each pair adjacent the upper ends thereof, latch means interconnecting the legs of each pair at a location intermediate the upper and lower ends thereof for releasably holding the legs in downwardly diverging relation, a horizontal rod connected to the forwardly inclined legs of each of said pair of legs adjacent the upper ends thereof for supporting said cards in a pack, ring-like supporting members spaced from each other along the axis of said rod and extending through said cards and around said rod for releasably suspending the entire group of cards from said rod and forming uninterrupted guides along which the cards may be individually transferred from the front of the pack of cards over the rod to the back of the pack, and means extending transversely of the rack and supported by said legs forming horizontally arranged pockets for supporting a plurality of cards in side-by-side relation below the level of said pack of cards when the cards are removed from suspended condition relative to said rod.

3. Educational apparatus for use in teaching reading classes and the like wherein cards each imprinted with a word or figure to be taught during each lesson of a group of lessons extending over a selected period are to be displayed to the class, comprising a display rack for continuously supporting the group of imprinted cards throughout the teaching period including a pair of downwardly diverging legs disposed at each side of the rack and lying in parallel planes, hinge means interconnecting the legs of each pair adjacent the upper ends thereof, latch means interconnecting the legs of each pair intermediate the upper and lower ends thereof for releasably holding the legs in downwardly diverging relation, a horizontal rod connected to the forwardly inclined legs of each of said pair of legs adjacent the upper ends thereof for supporting said cards in a single pack, said cards each having a pair of laterally spaced apertures adjacent the upper edges thereof, a pair of rings for supporting said cards from said horizontal rod each comprising a pair of arcuate sections hinged together at one pair of their ends and provided with locking formations at the other pair of their ends, said rings being adapted to be inserted through the apertures in said cards for releasably suspending the entire group of cards from said rod and forming guide rings along which the cards may be serially transferred from the front of the pack over the rod to the back of the pack, a blackboard panel affixed to said forwardly inclined legs and extending therebetween lying substantially in the plane of said forwardly inclined legs, hook means projecting forwardly of said blackboard panel and located adjacent the upper edge thereof, and a card supporting panel having apertures at the upper ends thereof adapted to be fitted over said hooks for suspending a card supporting panel therefrom, said last-mentioned panel having a plurality of transverse strips affixed along the lower and lateral edges of said strips in overlying relation thereto to provide upwardly opening pockets for supporting a plurality of said cards in side-by-side relation when said cards are removed from said rings.

References Cited in the file of this patent

UNITED STATES PATENTS

| | | |
|---|---|---|
| 371,338 | Matson | Oct. 11, 1887 |
| 1,280,930 | Wolfe | Oct. 8, 1918 |
| 2,486,509 | Turner | Nov. 1, 1949 |
| 2,723,817 | Harwood | Nov. 15, 1955 |